(12) United States Patent
Morishita et al.

(10) Patent No.: US 7,560,188 B2
(45) Date of Patent: Jul. 14, 2009

(54) NICKEL-METAL HYDRIDE RECHARGEABLE BATTERY

(75) Inventors: Nobuyasu Morishita, Toyohashi (JP); Shinichiro Ito, Kosai (JP); Hajime Seri, Izumiotsu (JP)

(73) Assignees: Panasonic Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 761 days.

(21) Appl. No.: 10/930,790

(22) Filed: Sep. 1, 2004

(65) Prior Publication Data

US 2005/0026032 A1   Feb. 3, 2005

Related U.S. Application Data

(63) Continuation of application No. 10/117,190, filed on Apr. 8, 2002, now abandoned.

(30) Foreign Application Priority Data

Apr. 9, 2001   (JP) .............................. 2001-109710

(51) Int. Cl.
 *H01M 4/02* (2006.01)
 *H01M 4/58* (2006.01)
(52) U.S. Cl. ..................... 429/50; 429/218.2; 429/13; 205/57
(58) Field of Classification Search ............... 429/218.2, 429/50; 205/57
 See application file for complete search history.

(56) References Cited

U.S. PATENT DOCUMENTS

| 5,654,115 | A | * | 8/1997 | Hasebe et al. ............. 429/218.2 |
| 6,207,323 | B1 | * | 3/2001 | Yamaguchi et al. ...... 429/218.2 |
| 6,284,066 | B1 | * | 9/2001 | Shinya et al. ................ 148/513 |
| 6,605,375 | B2 | * | 8/2003 | Ovshinsky et al. ............ 429/13 |
| 2002/0127466 | A1 | * | 9/2002 | Ovshinsky et al. ............ 429/50 |
| 2003/0003366 | A1 | | 1/2003 | Morishita et al. |

FOREIGN PATENT DOCUMENTS

| CN | 1079844 | 12/1993 |
| EP | 0588310 | 3/1994 |

OTHER PUBLICATIONS

An English language Abstract of Japanese Laid-Open Patent Application No. H11-162503, which published on Jun. 18, 1999, and was retrieved from the Database WPI, Section Ch, Week 199935, AN 1999-410006, XP 002268268.
Suresh M.S. et al., "Effect of Charge Rate on Instantaneous Charge Efficiency of Nickel/Hydrogen Cells," *Journal of Power Sources*, vol. 37, No. 3, Feb. 1, 1992, pp. 419-424.
Z. Z. Li et al., "Effect of Particle Size on Electrochemical Properties of Hydrogen Storage Alloy," Journal of Ordnance Engineering College, vol. 11, No. 3, Sep. 1999, pp. 53-56, together with an English language Abstract of the same.
English language Abstract of CN 1079844, Publication date Dec. 22, 1993.

* cited by examiner

*Primary Examiner*—Patrick Ryan
*Assistant Examiner*—Helen O Chu
(74) *Attorney, Agent, or Firm*—Greenblum & Bernstein, P.L.C.

(57) ABSTRACT

In a nickel-metal hydride rechargeable battery comprising a positive electrode of nickel hydroxide and a negative electrode of hydrogen-absorption alloy, prolonged battery life is achieved by limiting the charge and discharge operations to be performed in the range of 20-60% of the hydrogen-absorption capacity of the hydrogen-absorption alloy.

4 Claims, 2 Drawing Sheets

NICKEL-METAL HYDRIDE RECHARGEABLE BATTERY

CROSS-REFERENCE TO RELATED APPLICATIONS

This application is a continuation application of U.S. application Ser. No. 10/117,190, filed on Apr. 8, 2002, now abandoned, which claims priority of Japanese Patent Application No. 2001-109710, filed on Apr. 9, 2001, each of which are hereby expressly incorporated by reference herein in their entirety.

BACKGROUND OF THE INVENTION

1. Field of the Invention

The present invention relates to a nickel-metal hydride rechargeable battery, and more particularly to a nickel-metal hydride rechargeable battery intended for prolonged life.

2. Description of Related Art

A nickel-metal hydride rechargeable battery including positive electrode plates having nickel hydroxide as its active material, negative electrode plates having hydrogen-absorption alloy, and separators interposed therebetween, has been known and widely used.

In such a nickel-metal hydride rechargeable battery, operations are usually organized so as to have 10-80% of working load range for hydrogen-absorption capacity of the hydrogen-absorption alloy, corresponding to 0-100% of working load range for positive electrode capacity, and that, out of the hydrogen-absorption capacity, around 0-10% is set for a discharge reserve and 80-100% for a charge reserve.

In such nickel-metal hydride rechargeable batteries, allowing working forms of full charges and complete discharges, they are usually operated in the range of 0-100% of positive electrode capacity.

However, even in nickel-metal hydride rechargeable batteries having discharge and charge reserves at both end parts of the hydrogen-absorption capacity range of the hydrogen-absorption alloy, as mentioned above, the working forms of full charges and complete discharges result in deficiencies in the hydrogen-absorption alloy, such as a crack due to expansion at charging and corrosion due to repeated charge and discharge operations. These problems eventually lead to a shortened cycle life, which is expected to be overcome for prolonged battery life.

SUMMARY OF THE INVENTION

In light of the abovementioned problems, an object of the present invention is to provide a nickel-metal hydride rechargeable battery with prolonged life by limiting a working range of hydrogen-absorption capacity of hydrogen-absorption alloys.

A nickel-metal hydride rechargeable battery according to the present invention, including a positive electrode having nickel hydroxide and a negative electrode having a hydrogen-absorption alloy, is designed to be charged and discharged in the range of 20-60% of hydrogen-absorption capacity of the alloy. By limiting the working range of the hydrogen-absorption capacity in the range of 20-60% of the maximum capacity, cracks and corrosions in the hydrogen-absorption alloy of the negative electrode, which determine the life of the battery, are prevented. Consequently, total electric capacity usable for repeated charge-discharge cycles is increased and life characteristic as rechargeable battery is improved.

Conventionally, hydrogen-absorption alloys of 25-30 μm in average particle diameter are typically used in order to prevent hydrogen-absorption alloy from crack caused by expansion thereof during charging. In contrast, the nickel-metal hydride rechargeable battery of the invention employs hydrogen-absorption alloys of 10-25 μm in average particle diameter. Thus increased total surface area of the alloy enables the nickel-metal hydride rechargeable battery to be capable of heavy loading operation.

Though a quantity of alkaline electrolyte per negative electrode capacity is usually around 1.5 g/Ah, it is increased to 1.5-3 g/Ah in the invention. This is because there is a margin to gas absorption capacity resulted from operations with no full use of hydrogen-absorption capacity. Thus, a life shortening caused by decrease in alkaline electrolyte is suppressed.

Both increased output power and prolonged life are also attained by arranging a facing area, per negative electrode capacity, between opposing electrodes to be 45-65 cm$^2$/Ah.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Embodiments of the present invention will be described below with reference to FIGS. 1 and 2.

Figure 2:
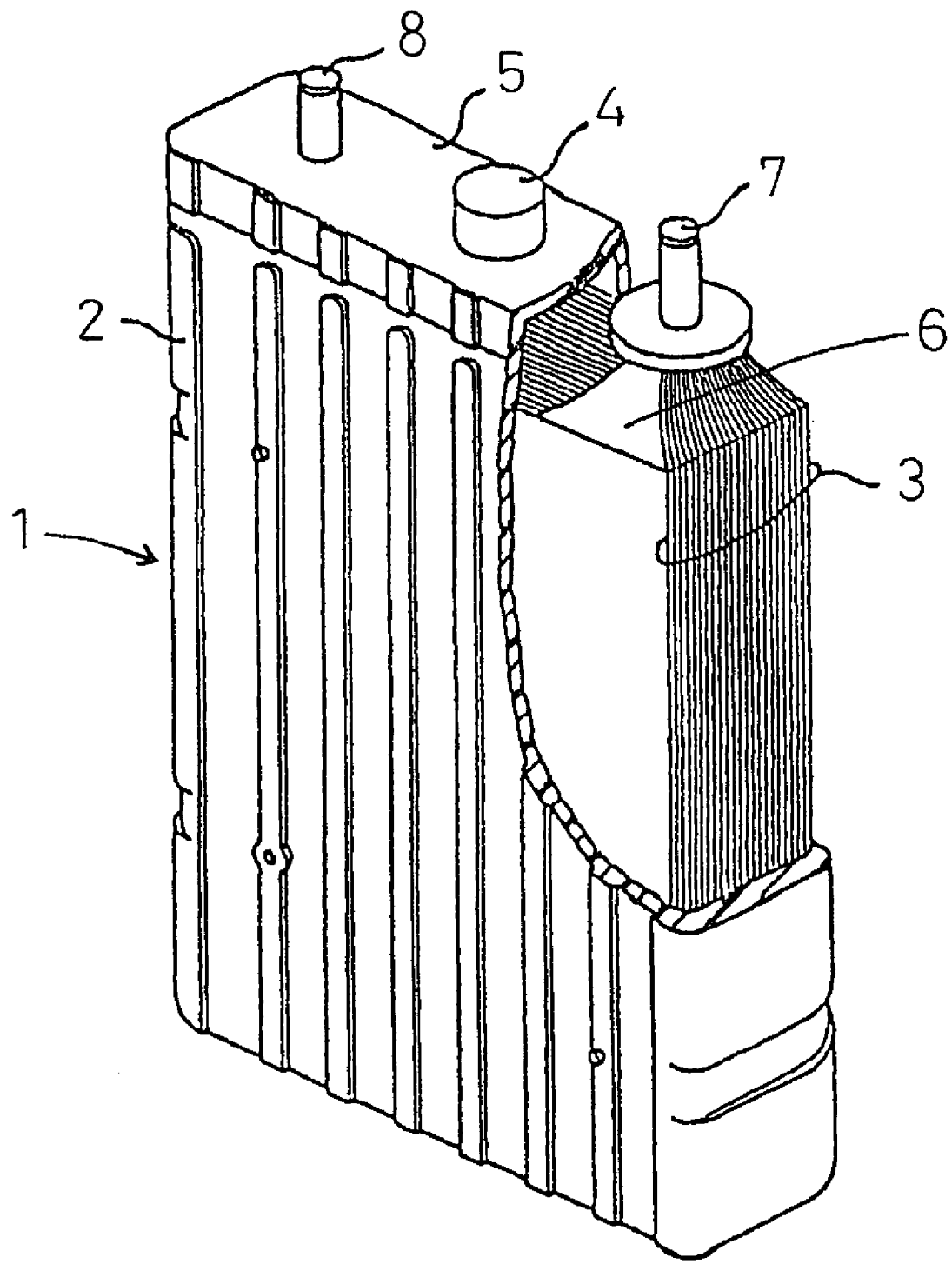
FIG. 2 is a partially broken perspective view of a nickel-metal hydride rechargeable battery.

As shown in FIG. 2, a nickel-metal hydride rechargeable battery 1 includes positive electrode plates having nickel hydroxide as its active material, and negative electrode plates having hydrogen-absorption alloy. An electrode plate group 3 is formed by alternately stacking of the negative electrode plates and the positive electrode plates covered with pouch-shaped separators made of non-woven polypropylene fabric. The electrode plate group 3 is placed, together with an electrolyte, in a battery case 2 made of synthetic resin. An opening of the case 2 is closed with a lid 5 having a safety vent 4. Leads 6 are extended from an upper edge of each positive electrode plate on one side of the electrode plate group 3, and are connected to a positive electrode terminal 7 by resistance welding. In the same way, leads 6 are extended from an upper edge of each negative electrode plate on the other side of the electrode plate group 3, and are connected to a negative electrode terminal 8 by resistance welding. The positive and negative electrode terminals 7 and 8 are attached to the lid 5.

In an embodiment, the positive electrode plate, with a capacity of 1 Ah and a reaction area per one side of 39.3 cm$^2$, was formed by filling a foamed nickel with a positive electrode material mainly comprising nickel hydroxide except an unfilled margin with a width of 5 mm and attaching a nickel lead to the unfilled margin. The negative electrode plate, with a capacity of 1.25 Ah and a reaction area per one side of 39.3 cm², was formed by coating a punched metal with a negative electrode material mainly comprising hydrogen-absorption alloy of 20 μm in average particle diameter except an uncoated margin with a width of 5 mm and attaching a nickel lead to the uncoated margin. The nickel-metal hydride rechargeable battery 1 was finally assembled by filling up the battery case 2 with 20 g of an electrolyte mainly comprising potassium hydroxide, and then by sealing the case 2 with the lid 5.

Then charge and discharge operations were performed at 0.1 C rate for activation. The electric power capacity was approximately 7 Ah. Furthermore, cobalt was added to the positive electrode in order to make a discharge reserve of the rechargeable battery become approximately 1 Ah.

Using the nickel-metal hydride rechargeable battery thus fabricated, several charge-discharge tests were performed under various conditions in order to investigate cycle life characteristic and output power characteristic.

(Experiment 1)

As an example of the invention, an initial charge was performed at a current of 1 A for 5 hours, and then from the 2nd cycle the experiment was performed under condition of discharge at 1 A for 4 hours and charge at 1 A for 4 hours and 4 minutes. In these cycles, the absorbed hydrogen was used for the charge-discharge operations in the range of approximately 20-60% of the hydrogen-absorption capacity of the negative electrode alloy.

While in an example of a conventional battery, the charge-discharge cycles were performed under the condition with a charge at 1 A for 7 hours and discharge at 1 A until discharge voltage became 1V. In this case, the absorbed hydrogen was used for the charge-discharge operations in the range of approximately 10-80% of the hydrogen-absorption capacity of the negative electrode alloy.

Figure 1:
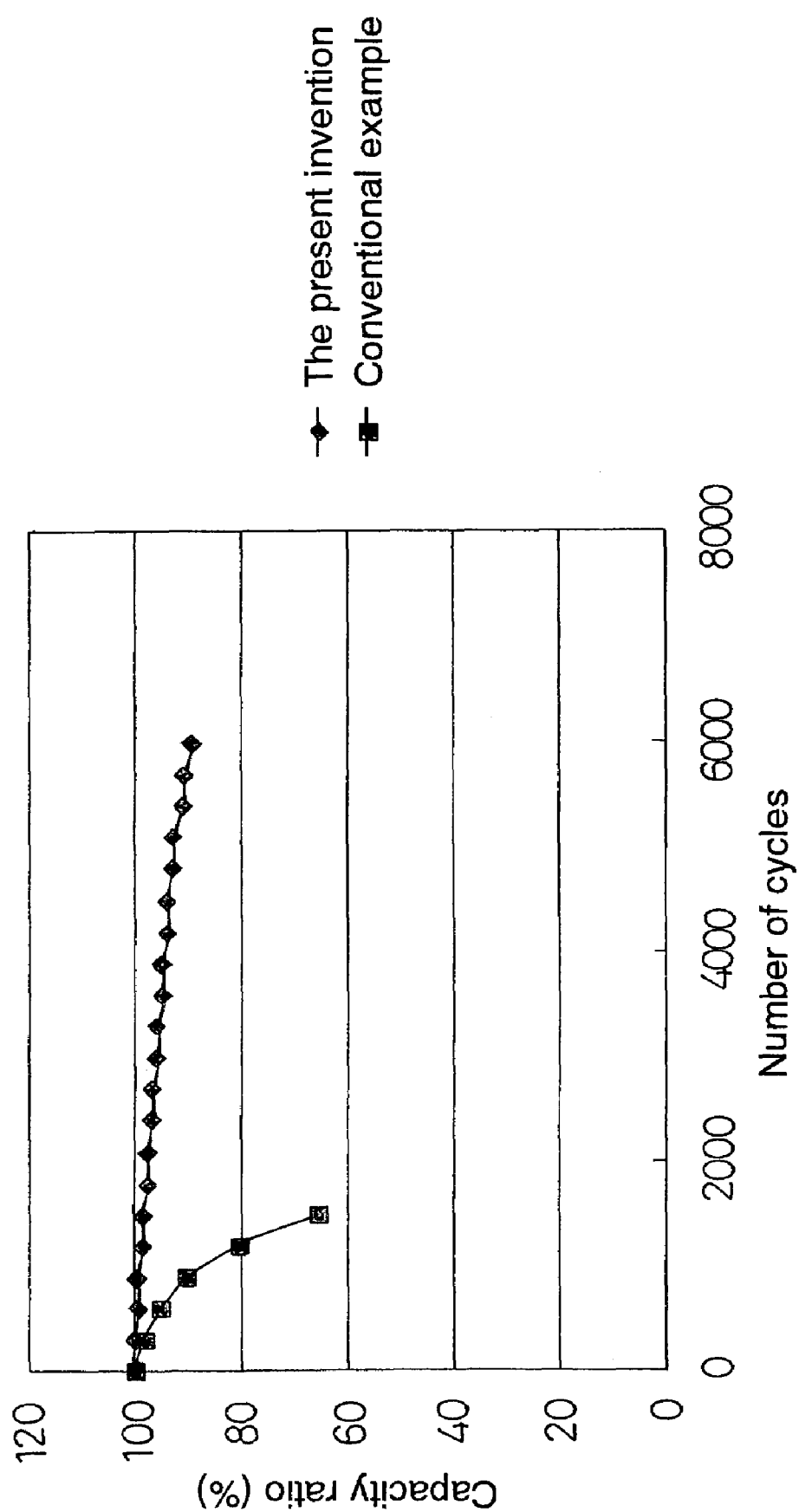
FIG. 1 is a graph showing results in the life tests on nickel-metal hydride rechargeable batteries of an embodiment of the present invention and a conventional example.

FIG. 1 shows changes in capacity ratio for each battery. Under a conventional working condition, the capacity ratio declined to 65% after 1500 cycles. While in the embodiment of the invention, enough capacity was maintained even after 6000 cycles, and life characteristics were proved to have been remarkably improved. Even taking different values of discharge capacity per cycle, approximately 7 Ah in the conventional example and approximately 4 Ah in the example of the invention, into considerations, the total discharge capacity is proved to be larger in the present invention.

(Experiment 2)

The same batteries as that of the experiment 1 were fabricated using negative electrodes including hydrogen-absorption alloys having varied average particle diameters of 8, 10, 15, 20, 25, 30 and 35 μm. Then, the same life tests were performed and output power characteristics were determined as in the experiment 1. The output power measurements were performed at large current discharge after having adjusted each battery to have SOC60%. The output power expressed by watt (W) was defined as the product of each current (A), capable of flowing for 10 seconds or more until output voltage becomes 1V, and the voltage values of 1V. The measured values in test results in Table 1 show averages for 10 batteries.

TABLE 1

| Average particle diameter (μm) | Life (cycle) | Output power (W) |
| --- | --- | --- |
| 8 | 1000 | 140 |
| 10 | 5000 | 140 |

TABLE 1-continued

| Average particle diameter (μm) | Life (cycle) | Output power (W) |
| --- | --- | --- |
| 15 | 5000 | 140 |
| 20 | 6000 or more | 130 |
| 25 | 6000 or more | 130 |
| 30 | 6000 or more | 120 |
| 35 | 6000 or more | 100 |

From the above results, in the case of the average alloy particle diameter of 35 μm, the output power declined due to smaller reaction surface area corresponding to too coarse alloy particles. In the case of 8 μm, the life characteristics declined due to corrosion worsening resulted from too large surface area and lowered electronic conductivity among alloy particles, both of which correspond to too fine alloy particles. Consequently, for assuring the life for 5000 cycles or more and the output power at 130 W or larger, the average particle diameter of 10-25 μm is proved to be appropriate.

(Experiment 3)

Varying a quantity of the electrolyte per negative electrode capacity to 0.7 g/Ah, 1 g/Ah, 1.5 g/Ah, 2 g/Ah, 3 g/Ah and 3.5 g/Ah, the same batteries as that of the experiment 1 were fabricated and the same life tests were performed as in the experiment 1. The output powers were also measured for each battery as in the experiment 2.

TABLE 2

| Electrolyte quantity (g/Ah) | Life (cycle) | Output power (W) |
| --- | --- | --- |
| 0.7 | 1000 | 80 |
| 1 | 5000 | 120 |
| 1.5 | 5000 | 130 |
| 2 | 6000 or more | 130 |
| 3 | 5000 | 130 |
| 3.5 | 4000 | 130 |

These results show that: in the case of the electrolyte quantity per negative electrode capacity of 3.5 g/Ah, too much electrolyte resulted in too frequent safety vent workings corresponding to emitting of the hydrogen gas out of the battery, which destroyed a balance between positive and negative electrodes and shortened the battery life. In the case of 0.7 g/Ah, too little electrolyte lowered the electronic conductivity among alloy particles and lead to striking decline of output power and life, and this tendency still remained in the case of 1 g/Ah. Consequently, for assuring the life for 5000 cycles or more and the output power at 130 W or larger, the electrolyte quantity of 1.5-3 g/Ah is proved to be appropriate.

(Experiment 4)

Varying facing area between opposing positive and negative electrodes, per negative electrode capacity, to 40 cm²/Ah, 45 cm²/Ah, 55 cm²/Ah, 65 cm²/Ah and 70 cm²/Ah, the same batteries as that of the experiment 1 were fabricated and the same life tests were performed as in the experiment 1. The output powers were also measured for each battery as in the experiment 2.

TABLE 3

| Facing area (cm²/Ah) | Life (cycle) | Output power (W) |
|---|---|---|
| 40 | 2500 | 100 |
| 45 | 5000 | 130 |
| 55 | 6000 or more | 130 |
| 65 | 5000 | 140 |
| 70 | 3500 | 150 |

These results show that: in the case of the facing area, per negative electrode capacity, between opposing positive and negative electrodes of 40 cm²/Ah, both life and output power declined due to smaller area for reaction. In the case of 70 cm²/Ah, the life also declined due to the promoted corrosion resulted from too large area for reaction. Consequently, for assuring the life for 5000 cycles or more and the output power at 130 W or larger, the facing area, per negative electrode capacity, between opposing positive and negative electrodes of 45-65 cm²/Ah is proved to be appropriate.

According to the nickel-metal hydride rechargeable battery of the invention, cracks and corrosions in the hydrogen-absorption alloy of the negative electrode, which determines the life of the rechargeable battery, is prevented by limiting the charge and discharge operations to be performed in the range of 20-60% of the hydrogen-absorption capacity of the hydrogen-absorption alloy; whereby the total quantity of electricity available for charge-discharge increases and the life characteristics as the rechargeable battery are improved so as to assure the battery provided with high reliability for a long time.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A process of operating a nickel-metal hydride rechargeable battery comprising:
    charging and discharging the battery in a range of 20-60% of hydrogen-absorption capacity of the hydrogen-absorption alloy;
    wherein the battery comprises:
        a positive electrode comprising nickel hydroxide;
        a negative electrode comprising a hydrogen-absorption alloy; and
        a separator interposed between the positive and negative electrodes; and
        a facing area between opposing negative and positive electrodes is in the range of 45-65 cm²/Ah per negative electrode capacity.

2. The process according to claim 1, wherein an average particle diameter of the hydrogen-absorption alloy is in the range of 10-25 μm.

3. The process according to claim 1, wherein a quantity of an alkaline electrolyte per negative electrode capacity is in the range of 1.5-3 g/Ah.

4. The process according to claim 2, wherein an average particle diameter of the hydrogen-absorption alloy is in the range of 10-15 μm.

* * * * *